Sept. 15, 1970          J. L. REIMERS          3,528,540
CONTAINER HANDLING APPARATUS
Filed Aug. 22, 1968          2 Sheets-Sheet 1
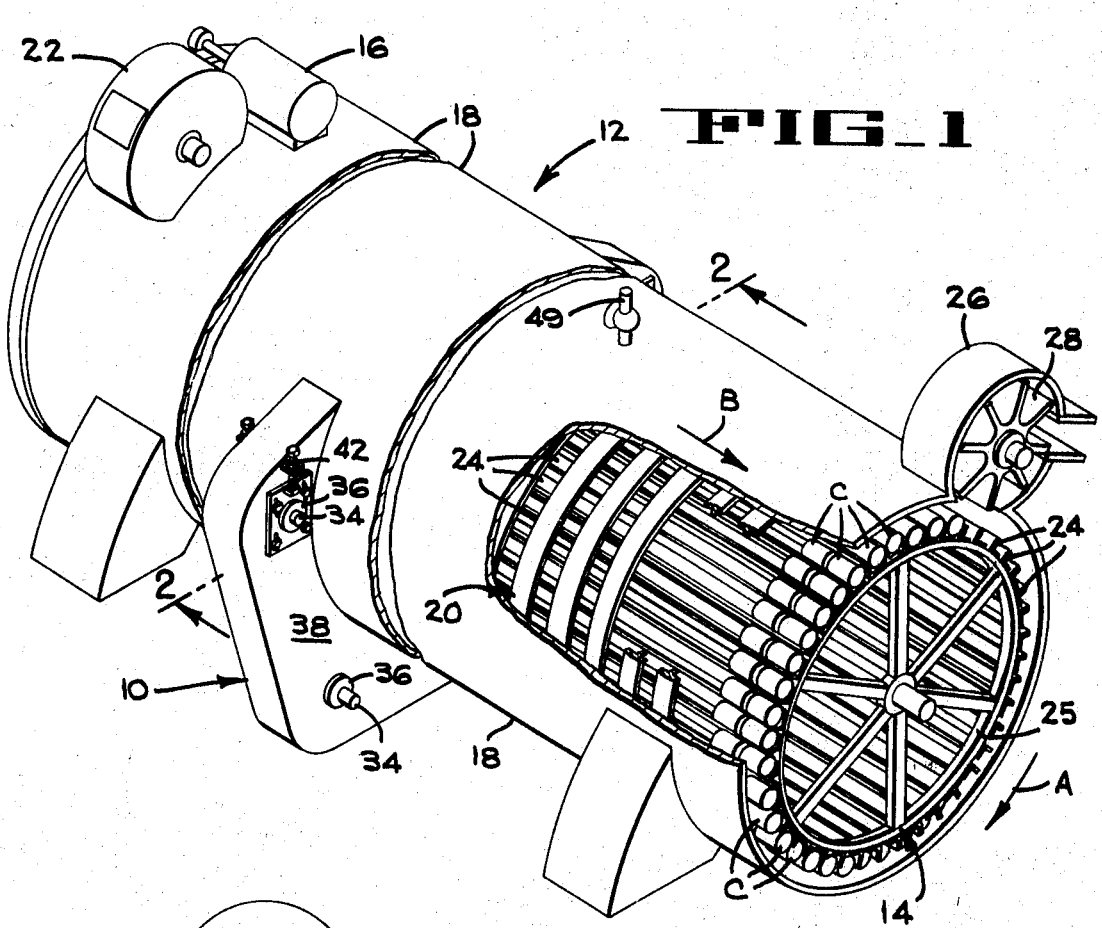
FIG_1
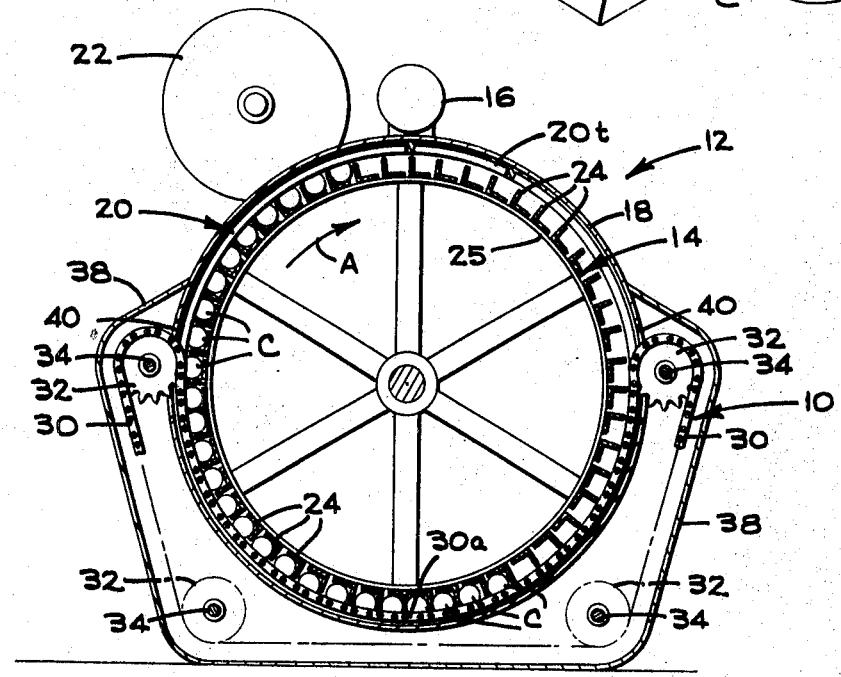
FIG_2
INVENTOR.
JAMES L. REIMERS
BY F. W. Anderson
C. C. Tripp
ATTORNEYS Sept. 15, 1970  J. L. REIMERS  3,528,540
CONTAINER HANDLING APPARATUS
Filed Aug. 22, 1968  2 Sheets-Sheet 2
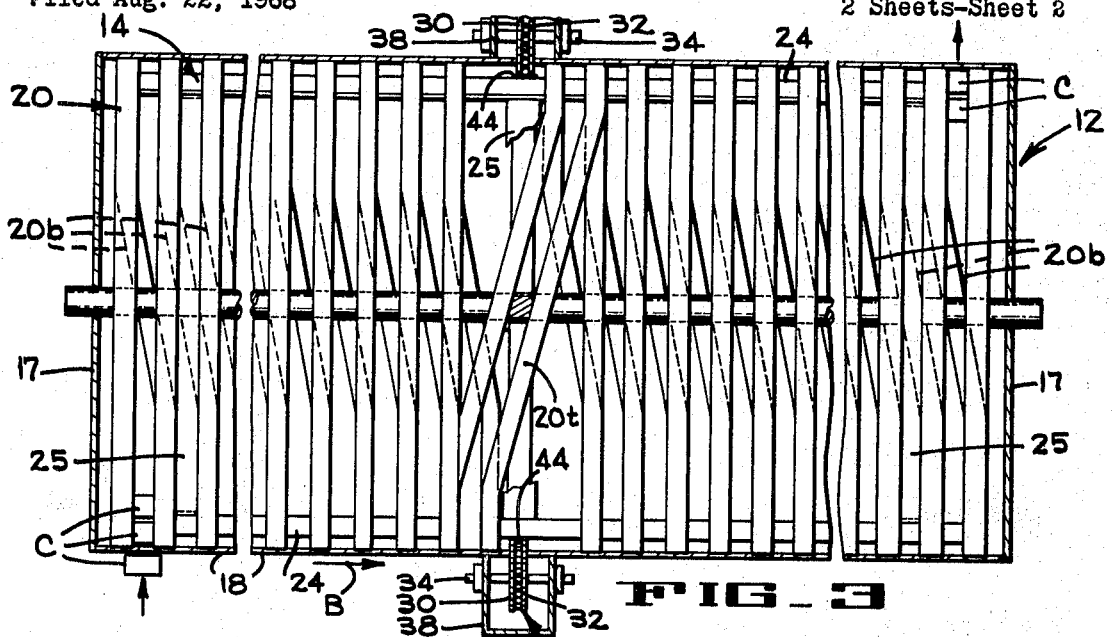
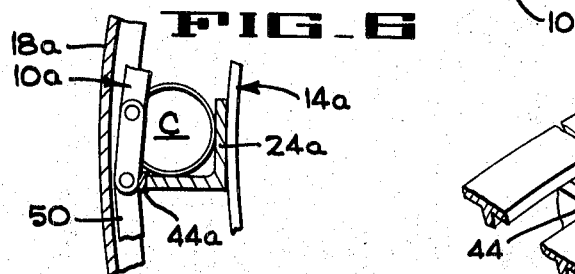
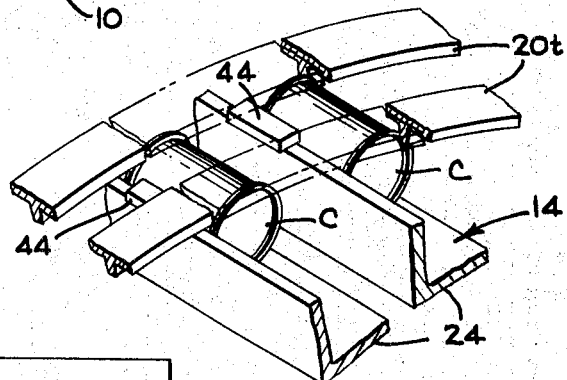
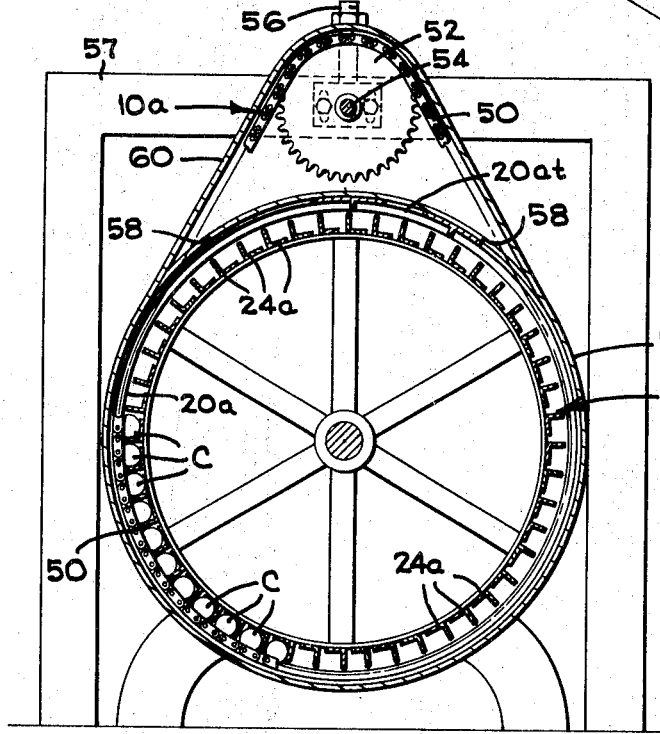
INVENTOR.
JAMES L. REIMERS
BY J. W. Anderson
C. E. Tripp
ATTORNEYS

# United States Patent Office 3,528,540
Patented Sept. 15, 1970

3,528,540
CONTAINER HANDLING APPARATUS
James L. Reimers, San Jose, Calif., assignor to FMC Corporation, San Jose, Calif., a corporation of Delaware
Filed Aug. 22, 1968, Ser. No. 754,631
Int. Cl. A23l *3/00;* B65g *29/00*
U.S. Cl. 198—211                                10 Claims

ABSTRACT OF THE DISCLOSURE

A reel and spiral cooker having a reel supporting mechanism disposed intermediate the ends thereof to prevent excessive deflection of the reel at its longitudinal midpoint and to permit use of reels more than twice as long as reels supported only at their ends.

CROSS-REFERENCE TO RELATED APPLICATION

Assignees copending application of Sherman H. Creed, Ser. No. 754,632 covers a rotary cooker similar to the subject cooker and was filed on even date herewith.

BACKGROUND OF THE INVENTION

Reel and spiral cookers of the type disclosed in United States Letters Pat. No. 2,536,116 to Paul C. Wilbur have been manufactured for many years with their reels supported for rotation only at their opposite ends. These cookers have been standardized at a length of about 39 feet because the weight of the reel and containers supported thereby cause the reels to deflect about $9/32$ of an inch at mid-span. If longer reels were used, much greater deflections could be expected, with the amount of deflection varying by the third power. If the deflection at midpoint becomes too large, the containers moving along the upper periphery of the reel would deflect downwardly out of engagement with the stationary spiral and accordingly would cause jamming of the mechanism.

SUMMARY OF THE INVENTION

The reel supporting mechanism of the present invention includes an endless chain which engages the lower peripheral portion of the reel at the longitudinal midpoint thereof, and accordingly, prevents deflection of the reel at that point. If the reel is to be longer than twice the standard 39 foot length, then a plurality of reel supporting mechanisms may be spaced at even intervals along the length of the reel.

BRIEF DESCRIPTION OF THE DRAWINGS

FIG. 1 is a diagrammatic perspective of the reel and spiral type cooker of the present invention with certain portions broken away to foreshorten the view and with portions of the discharge end broken away to illustrate the reel and spiral therein.

FIG. 2 is a vertical section taken along lines 2—2 of FIG. 1 illustrating the manner in which the reel supporting mechanism engages and supports the reel.

FIG. 3 is a diagrammatic plan of the spiral track illustrating a top spiral lead portion which moves the containers from one side of the supporting mechanism to the other without mechanical interference.

FIG. 4 is an enlarged perspective illustrating the spiral lead of FIG. 3.

FIG. 5 is a diagrammatic vertical section illustrating a second embodiment of the invention, the section being taken along the same plane as FIG 4.

FIG. 6 is an enlarged vertical section illustrating one of the reel angle bars in engagement with a chain of the supporting mechanism illustrated in FIG. 5.

DESCRIPTION OF PREFERRED EMBODIMENT

The reel supporting mechanism 10 (FIGS. 1 and 2) of the present invention is associated with a well known reel and spiral heat treatment apparatus 12 and is used in order to permit the use of longer apparatus than has been heretofore possible by supporting the central portion of the reel 14 thus preventing excessive deflection of the reel at that point. Although the reel supporting mechanism 10 of the heat treatment apparatus 12 will be described in conjunction with a rotary pressure cooker, it will be understood that the mechanism 10 operates equally well with other types of rotary container handling apparatus.

The heat treatment apparatus or cooker 12 comprises the reel 14 which is continuously driven by a motor 16 and suitable drive mechanisms (not shown) in a clockwise direction as indicated by the arrows A in FIGS. 1 and 2. The reel 14 is journaled in end walls 17 (FIG. 3) of a housing which includes a cylindrical shell. 18. A generally spiral track 20 of T-shaped cross-section is secured to the inner surface of the shell 18 and extends throughout the entire length of the shell. Containers C are fed into the housing, one at a time, between adjacent runs of the spiral track 20 by a continuously driven pressure feed valve 22. The containers are received in elongated angle bars or carriers 24 which extend the full length of the cylindrical shell 18 and are evenly spaced along the outer periphery of spaced wheels 25 of the reel 14. The carriers 24 and wheels 12 constitute a portion of the reel, and one wheel 25 (FIGS. 2 and 3) is aligned with the reel supporting mechanism 10.

The containers C are advanced longitudinally of the reel in the direction of arrow B by cooperation between the continuously rotating reel 14 and adjacent runs of the spiral track 20. In this way the containers are moved along a generally spiral path within the shell to a continuously driven pressure discharge valve 26 which includes a pocketed rotor 28 sealed to the rotor housing and is arranged to discharge the processed containers from the heat treatment apparatus 12. The apparatus 12 is of the type disclosed in the patent to Wilbur 2,536,116, and reference may be had to said patent for a more complete description of the drive parts and other components not described in detail herein or essential to the present invention.

The reel supporting mechanism 10 comprises an endless chain 30 trained around sprockets 32 keyed to shafts 34. The shafts 34 are journaled in bearings 36 secured to a chain housing 38 which is secured in pressure tight engagement to the cylindrical shell 18 and supports the shell at its midpoint. As shown in FIG 2, an arcuate reel supporting portion 30a of the chain 30 is disposed within the shell 18 and extends outwardly thereof through slots 40 in shell 18. At least one of the shafts 34 and associated bearings are supported by an adjustable takeup device 42 thus providing means for compensating for chain wear and for initially adjusting the chain 30 so as to prevent deflection of the central portion of the reel 14.

In order to avoid frictional wear on the angle bars 24, wear blocks 44 (FIG. 4) are welded to each angle bar 24, and are positioned to engage and be supported by the chain 30 when moving around the lower half of the cooker. Accordingly, the chain 30 supports the central portion of the reel 14 and if wear occurs either to the blocks 44 or to the chain, the chain may be adjusted to compensate for wear and to prevent any deflection when the reel is fully loaded.

In accordance with the present invention, if one or more of the reel supporting mechanisms 10 are positioned at spaced intervals longitudinally of the reel, substantially all mid-span deflection of the reel is prevented, and theoretically, the reel could be made in any desired length. In the preferred embodiment of the invention a single reel supporting mechanism 10 is positioned at the longitudinal mid-point of the cooker so as to permit cookers to be constructed in lengths between the standard 39 foot length and double that length.

As indicated in FIG. 2, the reel supporting portion 30a of the chain 30 is disposed within the path of movement of the container when the containers are in the lower half of the cooker. In order to prevent interference between the chain 30 and the containers, the spiral track 20 (FIG. 3) includes a plurality of parallel concentric ring segments interconnected at their lower ends to bottom lead portions 20b. These bottom lead portions are preferably positioned within about the bottom 100° of the shell 18. Since the containers cannot move past the chain 30 while moving around the lower half of the cooker, a top lead portion 20t of the track is provided in the upper half of the cooker which moves the containers past the plane of the chain 30.

In operation, a heat treatment medium under super-atmospheric pressure is directed into the shell 18 through valved conduit 49 and containers are continuously fed into the rotary pressure feed valve 22 (FIGS. 1 and 2) which deposits the containers in the angle bars 24 of the reel 14. The continuously driven reel moves the containers about its axis while the spiral track advances the containers longitudinally of the reel as indicated in FIG. 1 by the arrow B. As the containers approach the plane of the chain 30, they enter the upper lead portion 20t (FIGS. 3 and 4) of the track and are passed from one side of the chain to the other without interference. The containers then continue along the spiral track 20 until they are discharged from the cooker by the continuously driven rotary discharge valve 24.

The chain 30 supports the elongated reel 14 at its longitudinal midpoint, and in the plane of one of the wheels 25, thereby preventing deflection of the reel in this plane and permitting the use of much longer reels than have heretofore been possible. If chain wear occurs, the take-up devices 42 may be adjusted to compensate for wear.

The reel supporting mechanism 10a of the second embodiment of the invention is illustrated in FIGS. 5 and 6. Since the mechanism 10a of the second embodiment of the invention is associated with a cooker 12a that is quite similar to the first cooker 12, the parts of the second embodiment that are similar to the first embodiment will be assigned the same numerals followed by the letter *a*.

The reel supporting mechanism 10a comprises an endless chain 50 that is trained around the reel 14a at its longitudinal midpoint and is also trained around an idler sprocket 52. The idler sprocket is mounted on a shaft 54 journaled in bearings supported by take-up device 56 that is secured to a rigid frame 57. The lower portion of the chain 50 is positioned within the shell 18a and bears against wear blocks 44a (FIG. 6) which are welded to the angle bars 24a of the reel 14a. The chain 50 projects upwardly through slots 58 in the shell 18a, and the upper portion of the chain is sealed within a pressure tight housing 60. The upper lead portion 20at of the track 20a is similar to that shown in FIG. 3 except that the upper lead is positioned within about the upper 100° of the shell 18a.

It is apparent from the foregoing description that the two embodiments of the invention utilize an endless flexible member, such as a chain, which supports the lower half of the reel at its longitudinal midpoint and thus prevents deflection of the reel at that point. The apparatus also includes a spiral track which is provided with an upper lead portion which permits the containers to pass from one side of the plane of the endless flexible member to the other.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A container handling apparatus comprising an elongated housing having an inlet end and a discharge end, a driven elongated reel mounted for rotation in said housing and having a plurality of container receiving carriers on the periphery thereof, means for directing containers into said carriers adjacent said inlet end, a generally spiral track disposed within said housing and externally of said reel for engaging and moving the containers from said inlet end of said housing to said discharge end, means for discharging the containers from adjacent the discharge end of said housing, and reel supporting means carried by said housing intermediate the ends thereof for supporting said reel to preclude mid-span deflection of the reel.

2. An apparatus according to claim 1 wherein said reel supporting means includes an endless flexible member mounted for movement within said housing and having a portion thereof disposed in supporting engagement with said reel.

3. An apparatus according to claim 1 wherein said reel supporting means includes an endless chain, means supporting said chain for movement with a portion thereof engaging and supporting the lower peripheral portion of said reel.

4. An apparatus according to claim 3 wherein said supporting means additionally comprises adjustable chain supporting means for compensating for chain wear and for maintaining said intermediate portion of the reel supported in non-deflected position.

5. An apparatus according to claim 3 wherein said endless chain includes a reel supporting portion trained around approximately the lower half of said reel, and wherein said chain supporting means includes a pair of upper sprockets journaled adjacent a horizontal plane passing through the axis of said reel, and a pair of lower sprockets journaled below the lowermost portion of said reel.

6. An apparatus according to claim 3 wherein said endless chain includes a reel supporting portion trained around the lower portion of said reel, and wherein said chain supporting means includes a sprocket disposed above said reel, and means for mounting said sprockets for vertical adjustment relative to said reel.

7. An apparatus according to claim 2 wherein said flexible member lies in a vertical plane and engages the lower portion of the reel, and wherein an upper portion of said reel is free of said chain, said spiral track including a plurality of turns on both sides of said plane of said flexible member with the lead portions of the spiral turns at the lower end thereof, said spiral also including an upper lead portion for passing the containers from one of said vertical planes to the other.

8. An apparatus according to claim 4 wherein said chain lies in a vertical plane and engages the lower portion of the reel, and wherein an upper portion of said reel is spaced from said chain, said spiral track including a plurality of turns on both sides of said vertical plane of said flexible member with the lead portions at the lower ends thereof, said spiral track also including an upper lead portion for passing the containers from one side of said vertical plane to the other.

9. An apparatus according to claim 7 wherein wear blocks are secured to the outer periphery of each carrier of said reel and lie in said vertical plane, and wherein said chain engages said wear blocks.

10. An apparatus according to claim 9 wherein said reel includes a plurality of wheels which support the carriers at evenly spaced intervals on their outer peripheries, and wherein one of said wheels is disposed in said vertical plane.

References Cited
UNITED STATES PATENTS 1,551,133   8/1925   Chapman _____ 99—365 X EDWARD A. SROKA, Primary Examiner U.S. Cl. X.R.

99—365